United States Patent [19]
Welch

[11] 3,791,215
[45] Feb. 12, 1974

[54] BAROMETER

[76] Inventor: Medard W. Welch, 1111 Sheridan Rd., Winnetka, Ill. 60093

[22] Filed: Sept. 25, 1972

[21] Appl. No.: 291,672

[52] U.S. Cl. ............................................... 73/385
[51] Int. Cl. ............................................. G01l 7/20
[58] Field of Search ............................... 73/385, 401

[56] References Cited
UNITED STATES PATENTS

| | | | |
|---|---|---|---|
| 1,950,497 | 3/1934 | Kopp et al. | 73/385 |
| 1,015,886 | 1/1912 | Hammond | 73/385 |
| 2,300,000 | 10/1942 | Mayers | 73/385 |

Primary Examiner—Donald O. Woodiel
Attorney, Agent, or Firm—Parker, Plyer & McEachram

[57] ABSTRACT

This is a barometer of the mercury column type in which the diameter of the column is sufficiently small such that when the level changes, due to changes in atmospheric air pressure, the change in the level of the pool surface will be less than the accuracy within which conventional barometers can be read. Thus the scale opposite the top of the column does not have to be adjusted or "zeroed" to the pool level change.

2 Claims, 4 Drawing Figures

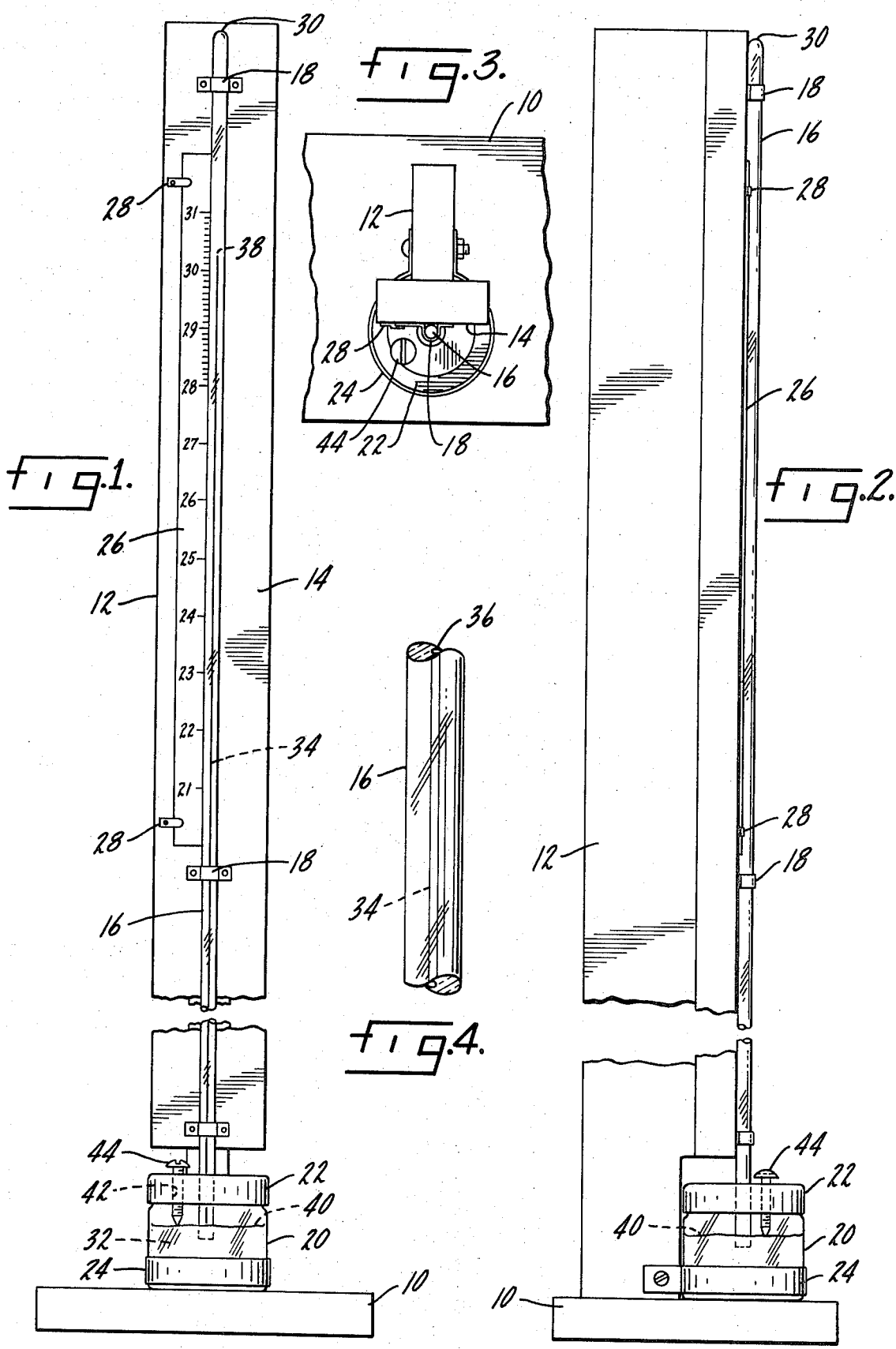

BAROMETER

SUMMARY OF THE INVENTION

This invention is concerned with a barometer of the mercury column type and is more specifically concerned with simplifying the manipulation and reading thereof.

A primary object of the invention is a mercury column barometer which does not require the scale opposite the top of the mercury column to be adjusted due to variations in the level of the pool.

Another object is a barometer of the mercury column type which has a diameter well below what was previously considered possible or feasible.

Another object is a mercury column barometer which is quite accurate even though the diameter of the column is well below what might otherwise be considered a precision instrument.

Another object is a mercury column barometer which is greatly simplified.

Other objects will appear from time to time during the ensuing specification and drawings.

DESCRIPTION OF THE DRAWINGS

FIG. 1 is a front view of a mercury column barometer;

FIG. 2 is a side view of FIG. 1;

FIG. 3 is a top view of FIG. 1; and

FIG. 4 is an enlarged part of the glass tube and mercury column.

DESCRIPTION OF THE PREFERRED EMBODIMENT

In FIG. 1, what would otherwise appear to be a conventional mercury column barometer has been shown, in which a base 10 of any suitable type supports an upright 12 suitably connected thereto. The front face 14 of the upright has a glass tube 16 suitably connected to it by brackets 18 or the like with the lower end of the tube extending into a container or well 20 which has a top 22 through which the tube extends and possibly a bracket 24 to hold the well or container in place. A scale 26 with suitable graduations thereon may be mounted on the front face 14 of the upright by clips or brackets 28 or any suitable mounting means. The top 30 of the glass tube is closed, as is conventional, while the bottom is open and extends into the mercury pool 32 with a mercury column 34 in the center passage or channel 36 in the tube. The passage in the tube is filled with mercury in a conventional manner, after which the lower end is inserted into the pool so that the top of the column of mercury 38 stabilizes at a height above the surface 40 of the pool which matches the atmospheric air pressure. The cap 22 may have a rubber interior which fits snugly around the exterior of the glass tube with a suitable opening 42 therethrough so that atmospheric air pressure communicates with the mercury pool. The opening 42 may be closed by a suitable screw or plug 44 when the unit is to be moved.

For years it has been thought that there was a lower limit below which you should not go for the internal diameter of the tube. Various texts and sources give varying dimensions, but it has been generally thought that approximately 4 millimeters was the minimum. If the internal diameter of the tube was less than that, it was believed that the instrument would lose accuracy because the amount of capillary depression of the barometric column due to the forces of surface tension acting at the mercury meniscus vary considerably. It has long been thought that mercury does not stand as high or move as well in a small barometer tube as it does in a large one on account of the surface tension of the liquid mercury. If the tube was below a certain limit, for example 5 millimeters, it could not be considered a precision instrument but would require a correction factor for capillarity. And the correction factor would vary depending upon whether the barometer was rising or falling at the time of observation.

It has been determined that this is not true and that a barometer with a passage diameter substantially below 4 millimeters will function quite accurately. For example, a barometer with a one millimeter diameter tube has been constructed and tested over a number of months and checked against a standard barometer with surprisingly accurate results. A ½ millimeter diameter tube should also be mentioned because at the present this is about as small as can be obtained from commercial sources. But assuming that smaller tubes were available, there is no reason why barometers with column diameters below one millimeter, for example down to ½ millimeter, would not function quite accurately. There will be a certain depression in any particular small diameter tube, the smaller the tube, the larger the depression. But for a given tube size, the depression will be constant and changes in column height will be accurate. Thus, a small diameter tube will merely need initial callibration and thereafter it will accurately reflect atmospheric pressure.

The advantage of using as small an internal diameter as possible is that when the height of the column changes due to a change in atmospheric pressure, a certain amount of mercury will be displaced, either into or out of the pool, depending upon whether the barometer is rising or falling. This will cause a change in the level of the pool. Since the barometer is read by observing the distance between the upper surface 40 of the pool and the top 38 of the column, if the level 40 of the pool changes substantially, the scale 26 must be adjusted, either up or down slightly, to "zero" it to the pool surface 40. Thus with each reading, the user must first adjust the scale so that its "zero" will be at the pool level 40. Then the upper end 38 of the column may be read. This is difficult and requires expensive and complicated gadgetry for "zeroing" the scale and is a nuisance and time-consuming to the user. It would be far preferable if the scale could be set at the factory and thereafter left in that position. This can be done if the change in pool level 40 is so slight that it is within the accuracy within which the barometer can be read. And this can be accomplished if the internal diameter of the tube is well below the previously considered lower limit, i.e. 4 millimeters.

Using an internal tube diameter well below the previously considered minimum will also allow the size of the pool to be greatly reduced without affecting the accuracy of the instrument.

While a preferred form of the invention has been shown and described, it should be understood that the illustration in the drawing is purely diagrammatic and is intended to do nothing more than illustrate a barometer. Since dimensions cannot be shown, the barometer shown in the drawings looks like a conventional barometer. The tube has been referred to as glass and the invention should also be considered to include conventional substitutes therefor. The dimensions set forth above, for example the lower limit of 4 millimeters, should not be taken as hard and fast limits. The point is that most, if not all, authorities have considered that the internal diameter of a barometer should not go below a certain lower limit, although the particular dimension has been subject to various opinions. Four millimeters is in the general area or range of the lower limit of the authorities and texts. One millimeter has been given as an example of commercially available tubes, but this also is subject to some variation since tubes are normally supplied with the internal diameter between certain tolerances. It has been stated that the pool size can and should be made as small as possible and the lower limit here is not known. The selection of pool size may be a matter of judgment with the understanding that it may be made as small as possible consistent with the level resulting therefrom changing an amount within the accuracy that the instrument can be read without requiring the scale to be changed or "zeroed" before each reading.

The embodiments of the invention in which an exclusive property or privilege is claimed are defined as follows:

1. In a barometer, an upright glass tube with an internal vertical passage closed adjacent the top, a mercury column in the passage and a pool at the bottom with the passage opening into the pool, a scale opposite the column, the diameter of the passage being on the order of ½-1 mm., the pool size being small and related to the passage diameter with movement of the mercury column in the passage in response to atmospheric air pressure changes causes changing in the pool level less than the reading accuracy of the barometer so that the scale does not have to be adjusted prior to each reading.

2. A method of making a barometer of the mercury column type including the steps of providing an upright glass tube with an internal vertical passage therethrough open at one end and closed at the other, providing a pool with the open lower end of the tube therein and a mercury column in the passage, positioning a scale opposite the upper end of the mercury column, making the diameter of the passage on the order of ½-1 mm., at least in the area opposite the scale, and making the pool size as small as possible, but not below that where the changes in the mercury level in the pool due to changes in atmospheric air pressure will be outside the accuracy within which the barometer can be read.

* * * * *